E. D. CASS.
NON-SKID PLATE FOR TRUCK WHEELS.
APPLICATION FILED MAR. 19, 1919.
1,368,893.
Patented Feb. 15, 1921.
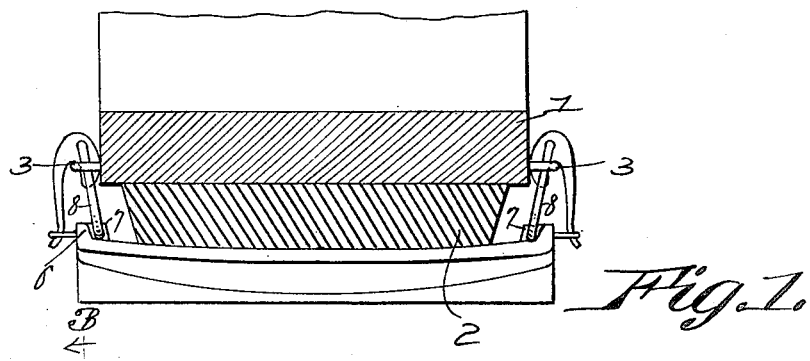
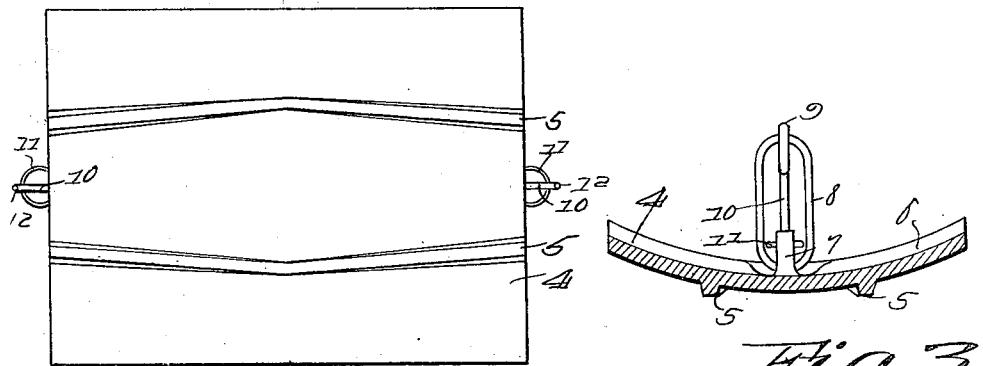
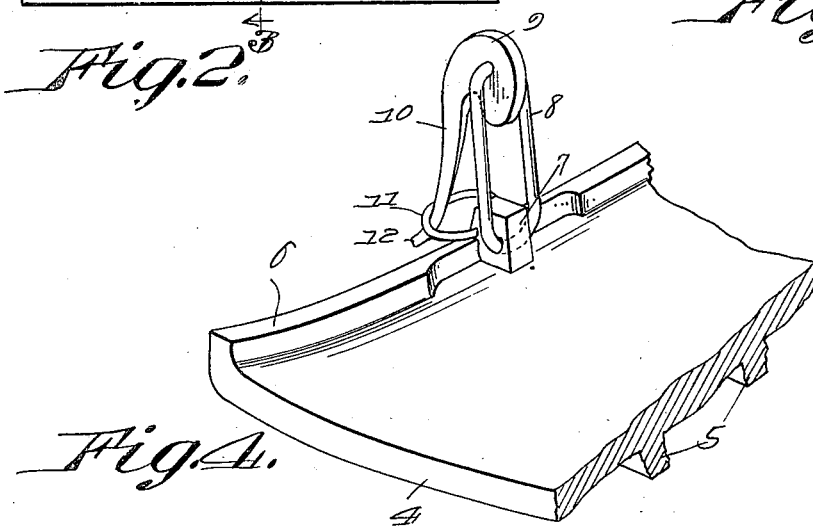
Inventor
Ernest D. Cass,
By
Attorney

UNITED STATES PATENT OFFICE.

ERNEST D. CASS, OF DETROIT, MICHIGAN.

NON-SKID PLATE FOR TRUCK-WHEELS.

1,368,893.　　　　Specification of Letters Patent.　　Patented Feb. 15, 1921.

Application filed March 19, 1919. Serial No. 283,559.

*To all whom it may concern:*

Be it known that I, ERNEST D. CASS, a citizen of the United States of America, residing at Detroit, in the county of Wayne and State of Michigan, have invented new and useful Improvements in Non-Skid Plates for Truck-Wheels, of which the following is a specification.

The purpose of the invention is to provide a non-skid attachment comprising a plurality of independent plates, separately attachable to the wheel of a truck to prevent skidding of the latter and to assist the truck in moving it out of mud holes and the like.

A further purpose of the invention is to provide novel means of attaching each of the plates to the truck wheels. A still further purpose is to provide a device of the above mentioned character, which is simple in construction, durable and effective in operation and inexpensive to manufacture.

To the exact construction in which it is shown and described, the invention is not to be restricted. The right is reserved to make such changes or alterations as the actual reduction to practice may suggest, in so far as such changes or alterations are compatible in spirit with the appended claims.

In the accompanying drawings:

Figure 1 is a view showing the practical application of the invention, the rim and tire of a truck wheel being shown in section.

Fig. 2 is a plan view of the invention looking at the under surface thereof.

Fig. 3 is a section on the line 3—3 of Fig. 1.

Fig. 4 is an enlarged detailed perspective view of a portion of one of the non-skid plates, this view illustrating the attaching means.

The invention comprises a non-skid plate for attachment to the wheel particularly of a motor truck, for example, such as a wheel, the rim 1 and tire 2 of which are illustrated in Fig. 1. Such truck wheels, it is common to provide on opposite sides of the rim with eyes 3 for attachment of non-skid chains and similar non-skidding devices and the present invention is designed to employ these eyes as means for attaching it to the wheel.

The non-skid device *per se* comprises a plate 4 of arcuate conformation in cross section to conform to the curvature of the tire 2 which it shields. This plate is attached to the wheel transversely of the latter and carries on its under surface the spaced ribs 5 which contact with the ground and constitute the non-skid means. At opposite ends the plate is formed with flanges 6 and adjacent these flanges and substantially in the middle of the plate, the latter is formed with the lugs 7 with which the links 8 are pivotally connected. At the opposite ends of the links there are pivotally connected the cam members 9 formed integral with which there are the fingers 10, these fingers 10 forming levers for the exertion of the pressure on the cam members, as well as forming hooks by which the device is attached to the eyes 3. A ring 11 is carried by each lug and is adapted to be swung over the free end of the fingers 10, the extremity of which is curved outwardly as indicated at 12 to retain the ring in engagement therewith once the ring is connected.

In the use of the device, the plate 4 is placed with its interior face against the tread of the tire 2 and the fingers 10 are trained through the eyes 3, thus bringing the adjacent ends of the links in the eyes as well as the cam members 8. The turning of the fingers 10 in a direction away from the rim 1 then forces the edges of the cam members against the sides of the rim, when the connection of the rings 11 with the hook ends 12 of the fingers retains these cam members in such engagement and locks the plate on the wheel. One of the improved non-skid plates is attached wherever a pair of eyes 3 exists and the truck wheel employing the improved device is thus equipped in such a manner as to prevent its skidding and to enable it to force it out of any mire in which it may be caught.

The invention having been described, what is claimed as new and useful is:

1. The combination with a wheel rim having eyes on its sides and a tire on its periphery, of a plate lying against the tire, the said plate having non-skid means on its outer face, and attaching means carried by the plate and embodying cam elements engaging the eyes and bearing against the sides of the rim to secure the plate against the tire for the useful purpose specified.

2. The combination with a wheel rim having eyes on its sides and a tire on its periphery, of a plate lying against the tire, the said plate having non-skid means on its outer face, links pivotally connected with the plate on opposite sides of the tire, cam members pivotally connected with the links and being formed with fingers, the cam members and the said links entering the said eyes whereby the fingers may be depressed to bring the cam members into firm engagement with the rim, and lock means carried by the plate and engaging the extremities of the fingers for the useful purpose specified.

In testimony whereof I affix my signautre.

ERNEST D. CASS.